US008842111B2

(12) United States Patent
Kambhatla et al.

(10) Patent No.: US 8,842,111 B2
(45) Date of Patent: Sep. 23, 2014

(54) TECHNIQUES FOR SELECTIVELY CHANGING DISPLAY REFRESH RATE

(75) Inventors: Srikanth Kambhatla, Portland, OR (US); Sameer Kalathil Perazhi, Bangalore (IN); Rama Gopal M. Satyanantha, Bangalore (IN); Santosh K. Agrawal, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 1022 days.

(21) Appl. No.: 12/885,708

(22) Filed: Sep. 20, 2010

(65) Prior Publication Data

US 2012/0068993 A1    Mar. 22, 2012

(51) Int. Cl.
*G09G 5/00* (2006.01)
*G09G 5/399* (2006.01)
*G09G 5/397* (2006.01)

(52) U.S. Cl.
CPC .......... *G09G 5/00* (2013.01); *G09G 2320/0247* (2013.01); *G09G 5/399* (2013.01); *G09G 2340/0435* (2013.01); *G09G 2360/121* (2013.01); *G09G 5/397* (2013.01)
USPC ......................................... 345/213; 345/539

(58) Field of Classification Search
CPC .......... G09G 2330/00; G09G 2330/02; G09G 2330/021; G09G 2330/022; G09G 2330/023; G09G 2340/04; G09G 2340/0407; G09G 2340/0414; G09G 2340/0421; G09G 2340/0435; G09G 2320/0247; G09G 2360/12; G09G 2360/121
USPC ................ 345/204–215, 501–503, 546, 562, 345/690–698, 534, 619, 419, 87; 348/447, 348/207.1, 554; 375/240.01
See application file for complete search history.

(56) References Cited

U.S. PATENT DOCUMENTS

| 5,648,795 A | * | 7/1997 | Vouri et al. | 345/698 |
| 5,657,478 A | * | 8/1997 | Recker et al. | 345/503 |
| 6,049,316 A | * | 4/2000 | Nolan et al. | 345/698 |

(Continued)

FOREIGN PATENT DOCUMENTS

| TW | 200837700 A | 9/2008 |
| TW | 201030721 A | 8/2010 |
| WO | 2012/040129 A2 | 3/2012 |
| WO | 2012/040129 A3 | 6/2012 |

OTHER PUBLICATIONS

Mohanty et al., "A Novel Algorithm for Efficient Paging in Mobile WiMAX", Intel Corporation, © 2007 IEEE, pp. 48-53.

(Continued)

*Primary Examiner* — Dwayne Bost
*Assistant Examiner* — Darlene M Ritchie
(74) *Attorney, Agent, or Firm* — Glen B. Choi

(57) ABSTRACT

Techniques are described that can be used to adjust a refresh rate of a display device. For example, the refresh rate change can be triggered by a user application for a variety of circumstances such as a change in power source from AC to DC or display of 24 frames per second (fps) video. Contents of a primary buffer can be copied to a dummy buffer and a display engine can read video from the dummy buffer to provide video to a display. The clock rate of a clock used to read out pixels can be adjusted using software commands. Video is written to another buffer and during a vertical blanking interval, the display engine reads frames from the another buffer instead of the dummy buffer.

19 Claims, 5 Drawing Sheets

(56) References Cited

U.S. PATENT DOCUMENTS

| | | | |
|---|---|---|---|
| 6,091,432 A * | 7/2000 | Diehl et al. | 345/562 |
| 7,206,007 B2 * | 4/2007 | Huang et al. | 345/698 |
| 8,040,334 B2 * | 10/2011 | Kim | 345/204 |
| 8,330,761 B2 * | 12/2012 | Lin et al. | 345/501 |
| 2001/0052887 A1 * | 12/2001 | Tsutsui et al. | 345/87 |
| 2003/0090571 A1 * | 5/2003 | Scheurich | 348/207.1 |
| 2006/0050075 A1 | 3/2006 | Gong et al. | |
| 2007/0120839 A1 * | 5/2007 | Liao | 345/213 |
| 2007/0252795 A1 * | 11/2007 | Shiomi | 345/87 |
| 2007/0279407 A1 * | 12/2007 | Vasquez et al. | 345/213 |
| 2008/0055318 A1 | 3/2008 | Glen | |
| 2008/0100598 A1 * | 5/2008 | Juenger | 345/204 |
| 2008/0143729 A1 | 6/2008 | Wyatt et al. | |
| 2008/0192060 A1 * | 8/2008 | Ogiso | 345/546 |
| 2008/0309652 A1 * | 12/2008 | Ostlund | 345/211 |
| 2009/0295786 A1 * | 12/2009 | Ito et al. | 345/215 |
| 2010/0149413 A1 * | 6/2010 | Kumakawa | 348/447 |

OTHER PUBLICATIONS

International Search Report & Written Opinion mailed in PCT Application Serial No. PCT/US2011/052232, mailed Apr. 17, 2012, 7 pages.

International Preliminary Report on Patentability for PCT Patent Application No. PCT/US2011/052232, mailed on Apr. 4, 2013, 6 pages.

Office Action received for Taiwanese Patent Application No. 100133867, mailed on Nov. 13, 2013, 10 pages of Taiwanese Office Action.

* cited by examiner

TECHNIQUES FOR SELECTIVELY CHANGING DISPLAY REFRESH RATE

FIELD

The subject matter disclosed herein relates generally to techniques for changing display properties of a panel.

RELATED ART

Power conservation is an important consideration in portable computers, such as mobile phones, mobile internet devices, and laptop computers that rely on battery power or direct current (DC) power. A graphics engine reads image data and provides the image data for display. An idle graphics engine can cause a change to a lower power use mode. In order to conserve overall platform power, some technologies switch the video mode to a lower refresh rate (RR). Other techniques for lowering power use include lowering the resolution of the display and lowering the color quality.

Known software-based techniques for changing a RR involve a notification to the operating system (OS) through a mode change. The mode change can cause a flash on the screen, which is an undesirable visual artifact. One reason for a screen flash is because the OS requests overwriting a buffer with all zeros prior to the use of the buffer. As a result, a black screen is displayed using content from the buffer prior to displaying content that is written into the buffer.

A technique for changing refresh rate without involving the OS is to change the refresh rate only when the graphics engine is in an idle state. However, this can result in frequent changes into and out of the lower refresh rate because the graphics engine can change states from idle to active frequently. More power could be conserved were the system to remain in lower refresh rate mode for longer.

BRIEF DESCRIPTION OF THE DRAWINGS

Embodiments of the present invention are illustrated by way of example, and not by way of limitation, in the drawings and in which like reference numerals refer to similar elements.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Various embodiments allow software to notify the OS about the change in refresh rate while avoiding a screen flash that is associated with OS-involved changes to the refresh rate. In response to a request to change a refresh rate, the OS requests a driver to blank a next frame buffer. The driver however ignores the request to blank the next frame buffer. The driver requests copying of contents of the original frame buffer to a dummy frame buffer. A display engine reads frames from the dummy frame buffer and a screen flash is avoided. During a next vertical blanking interval (VBI) or horizontal blanking interval (HBI), the display driver causes the refresh rate change to occur so that no artifacts are shown as a result of the change in frame refresh rate.

Figure 1:
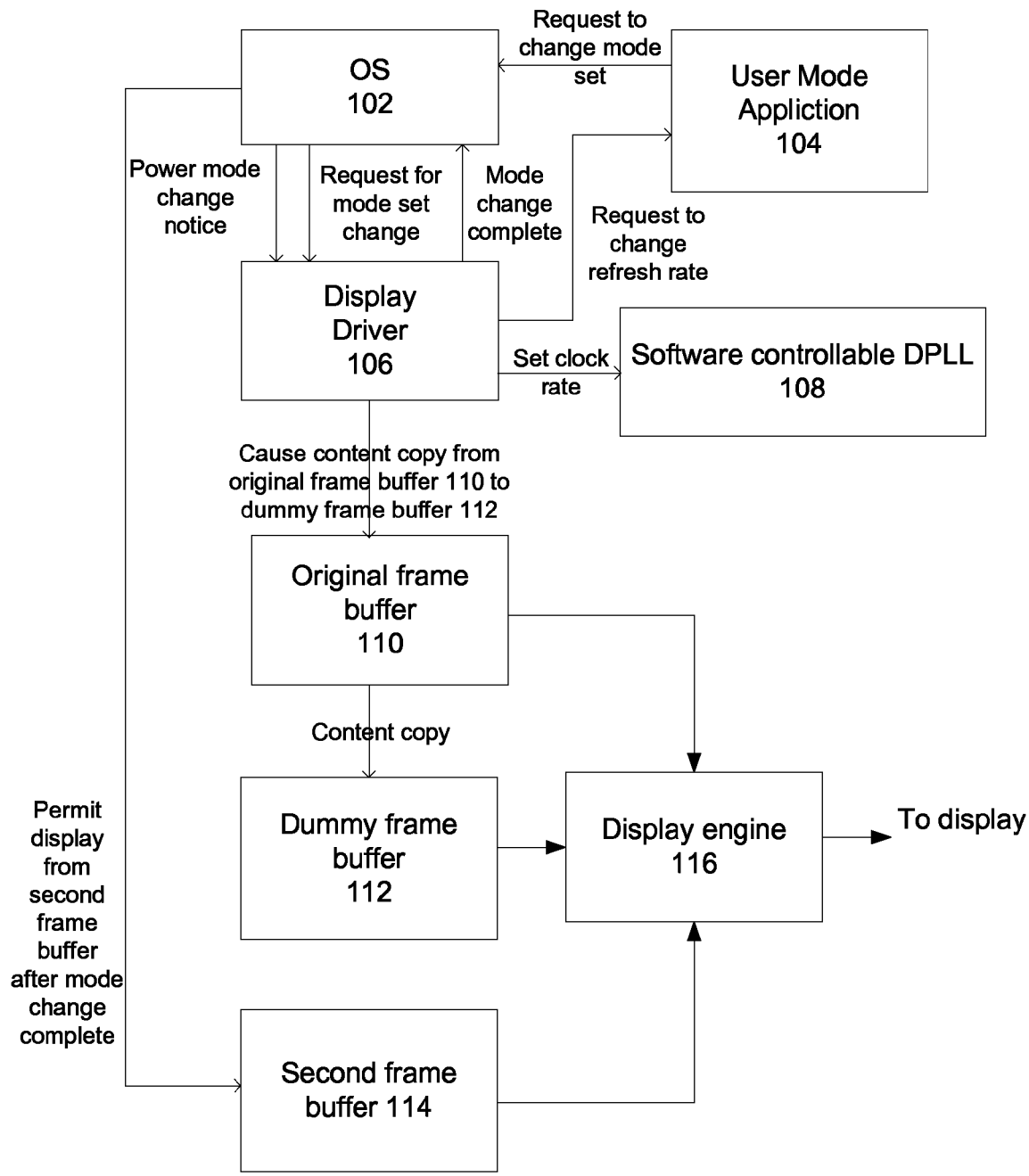
FIG. 1 depicts an example of components used in various embodiments.

FIG. 1 depicts an example of components used in various embodiments. Operating system (OS) 102 detects whether the system is in extended battery mode or uses DC power. OS 102 notifies display driver 106 of a power mode change. Display driver 106 requests user mode application 104 to change refresh rate to a desired rate if display driver 106 supports multiple refresh rates. In some cases, a power conservation module can trigger a switch to a lower refresh rate in response to changing power source to DC or battery. The power conservation module can issue a request to OS 102 to change the refresh rate.

In other cases, a media player application can request to switch to a screen refresh rate of 48 or 50 Hz when video is played at 24 frames per second (fps). The media player application can issue a request to OS 102 to change the refresh rate. Viewing video at 24 fps for a display refresh rate of 48 or 50 Hz can provide more visually appealing experience with fewer visual artifacts than when a display refresh rate of 60 Hz is used. For example, when the panel is driven at 60 Hz and video is being played at 24 fps, the user sees consecutive movie frames being shown for either 3 display frames or 2 display frames (i.e. 3:2 pull down). If the display is switched to 48 Hz (or some close refresh rate such as 50 Hz), each movie frame is shown for the same amount of time thereby improving user experience. If the power source changes to AC and video continues to be displayed at 24 fps, then the display can remain refreshed at 48/50 Hz. In some cases, regardless of whether a change in power source has occurred, a media player application can request change of refresh rate.

A user mode application 104 can issue a standard call concerning video mode change to OS 102 to request a refresh rate change. In some cases, user mode application 104 can be the user mode software provided by a hardware vendor. The hardware vendor can be the manufacturer of a display engine or display device. A user mode application 104 can be a power conservation module or a media player application. OS 102 requests a mode set change to change the refresh rate by issuing a call to display driver 106. Original frame buffer 110 is the frame buffer from which display engine 116 reads frames for display prior to any request to change refresh rate. Display driver 106 requests copying of contents of original frame buffer 110 to dummy frame buffer 112 and initializes display engine 116 to stream frames from dummy frame buffer 112. At least for display systems compatible with low-voltage differential signaling (LVDS), available from ANSI/TIA/EIA-644-A (2001), display driver 106 also requests a change in clock rate of software controllable digital phase lock loop (DPLL) 108 to the requested refresh rate. Some DisplayPort (DP) compatible panels have a software controllable clock frequency. DP is described in Video Electronics Standards Association (VESA) DisplayPort Standard, Version 1, Revision 1a (2008) and revisions thereof. For example, a timing controller (TCON) in a DP compatible display uses a DPLL 108 to control refresh rate and can support multiple refresh rates. The TCON has an input frequency from which to derive an output pixel clock signal. For example, a DPLL generates 80 or 100 MHz clock to drive rate at which pixels streamed out of a frame buffer. M and N values are used to control the frequency of the output pixel clock signal. In some cases, display driver 106 causes the refresh rate change to occur during a vertical blanking interval (VBI) or horizontal blanking interval (HBI) so that no artifacts are shown as a result of the change in frame refresh rate. Display driver 106 issues an indication of completion of the mode set to OS 102. OS 102 causes frames to be written to a second frame buffer 114 for display to a display device using display engine 116.

Figure 2:
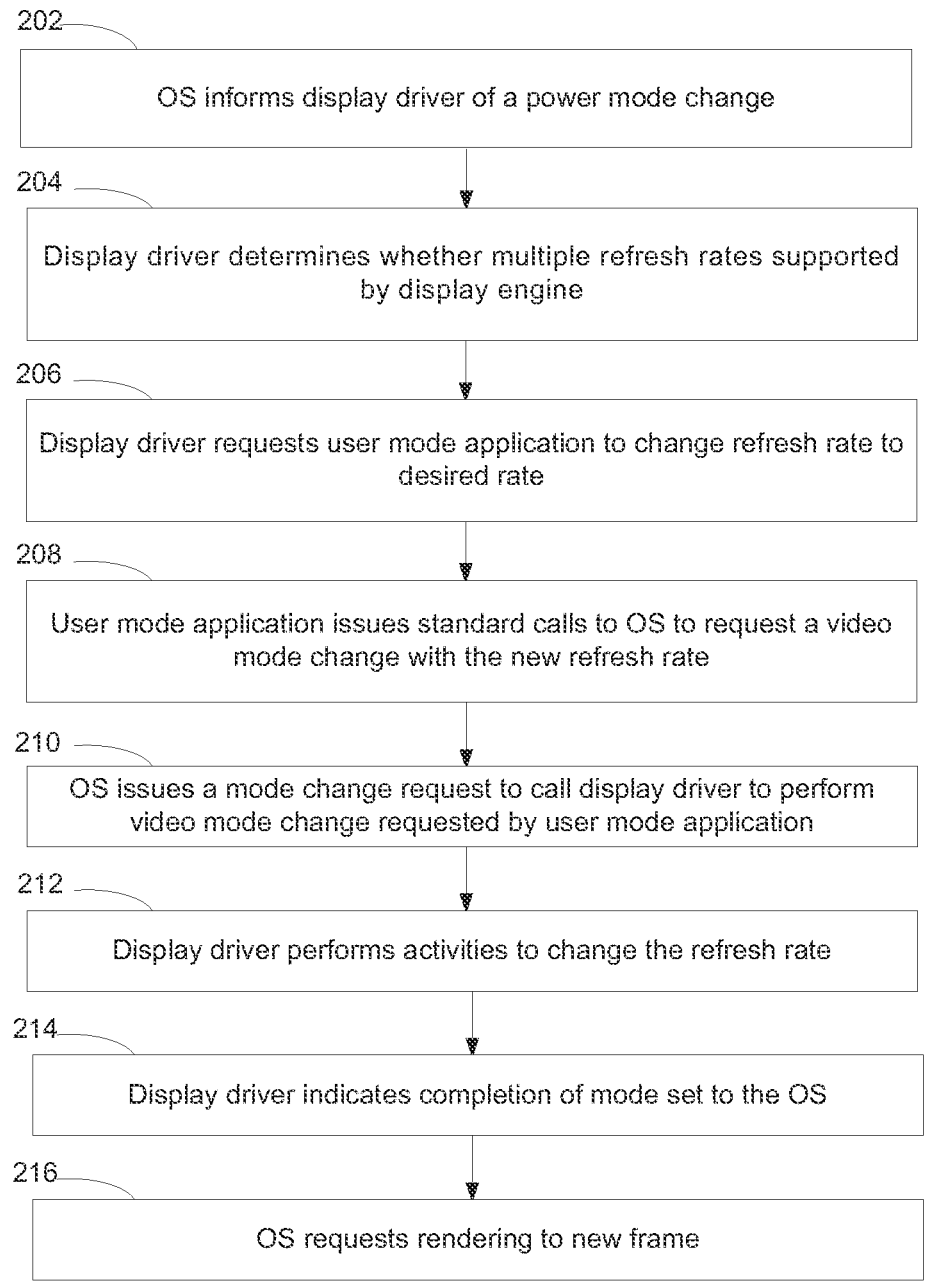
FIG. 2 depicts an example process that can be used to change a refresh rate of a display.

FIG. 2 depicts an example process that can be used to change a refresh rate of a display. The process can be used to change a refresh rate to a higher refresh rate or lower refresh rate than the current refresh rate.

Block 202 includes an operating system informing a display driver for a display engine of a power mode change to a DC or battery power.

Block 204 includes the display driver determining whether multiple refresh rates are supported by the display engine. If multiple refresh rates are supported by the display engine, then in block 206, the display driver requests that the user mode application change refresh rate to the desired rate. The display driver can request a display engine to change to a lower refresh rate in response to the system using DC power, extended battery power profiles, or display of video at 24 fps. Lowering the refresh rate can cause the display engine to use less power and/or provide better video quality. The lower refresh rate can be lower than 60 Hz such as 50 Hz or another frequency such as 48 Hz.

To change refresh rate in response to 24 fps, the following can take place: video player requests display driver if display driver supports multiple refresh rates. If multiple refresh rates supported, then video player issues standard calls to OS to request video mode change to new refresh rate.

Block 208 includes the user mode application issuing standard calls to the OS to request a video mode change with a new refresh rate. For a Windows compatible OS, the standard call can be a Win32 call to change video mode.

Block 210 includes the OS issuing a mode change request to call the display driver to perform the video mode change requested by the user mode application. A full new mode set includes changing resolutions, changing buffers, stopping display pipeline, zeroing out buffers as well as shutting down and restarting components. Performing a full mode set can cause a visible flicker on the display. However, in accordance with various embodiments, because the display driver knows the new mode set is for a refresh rate change, in block 212, instead of a full mode set, the display driver will perform activities to change the refresh rate.

A driver can know that a mode change is just a refresh rate change and does not perform full mode set based on implementation/OS specific techniques. For example, an application can use an interface that notifies the driver that an upcoming mode set is for a refresh rate change alone. The driver will proceed with a refresh rate change. In another example, the OS itself can notify the driver that the upcoming mode set is for refresh rate change alone given that the OS knows the change is for refresh rate alone. The OS can indicate flags while calling the mode set of the driver that the change is for RR alone.

Block 212 includes the display driver responding to the request to perform a video mode change by performing the following: (a) do not permit or perform blanking the next frame buffer; (b) request copy of the current frame buffer to a dummy buffer (can happen at any time before, during, or after any blanking interval); (c) initialize the display engine in the display to start streaming from the dummy buffer; and (d) request a change in the clock frequency of the refresh rate clock. The display engine changes (flips) from streaming from the original frame buffer to streaming from a dummy buffer for the next or later frame after the next or later vertical blanking interval. The clock rate switch is sufficient for a refresh rate change. The clock rate can be changed during the next or later vertical blanking interval (i.e., for a next frame).

Because the display engine is streaming video out of a dummy buffer, the display visually remains intact without a blanking that would have occurred by reading out of a blank frame in the blanked next frame buffer. Display of the blank frame prior to copied frame contents causes a visible blanking.

Block 214 includes the display driver indicating completion of the mode set to the OS. The display driver returns an indication of success to the OS concerning the OS's request to change the mode set, even when just the refresh rate is changed. Based on the success indicator, the OS clears/deletes the original frame buffer. The OS may not know that the display engine is streaming out of the dummy frame buffer.

Block 216 includes the OS requesting rendering to a new frame buffer and requesting the display driver to switch from reading from the dummy buffer to reading from the new frame buffer. The new frame buffer can be set as the original frame buffer so that the original frame buffer is overwritten. After a mode change, the OS is made aware of the address of the new frame buffer and starts rendering to the new frame buffer. OS starts rendering to that new frame buffer at the new refresh rate for the next frame. The dummy frame buffer can be made available to be overwritten. In some embodiments, the display engine changes to using the new frame buffer during the Video Blanking Interval (VBI) of the frame, so no flicker is visible. In some cases, use of the new frame buffer can occur during a horizontal blanking interval (HBI).

After the refresh rate has changed, the driver resets its state to complete mode changes to perform mode set changes as requested except that other instances of mode changes where only the refresh rate is changed are performed using the process of FIG. 2.

Figure 3:
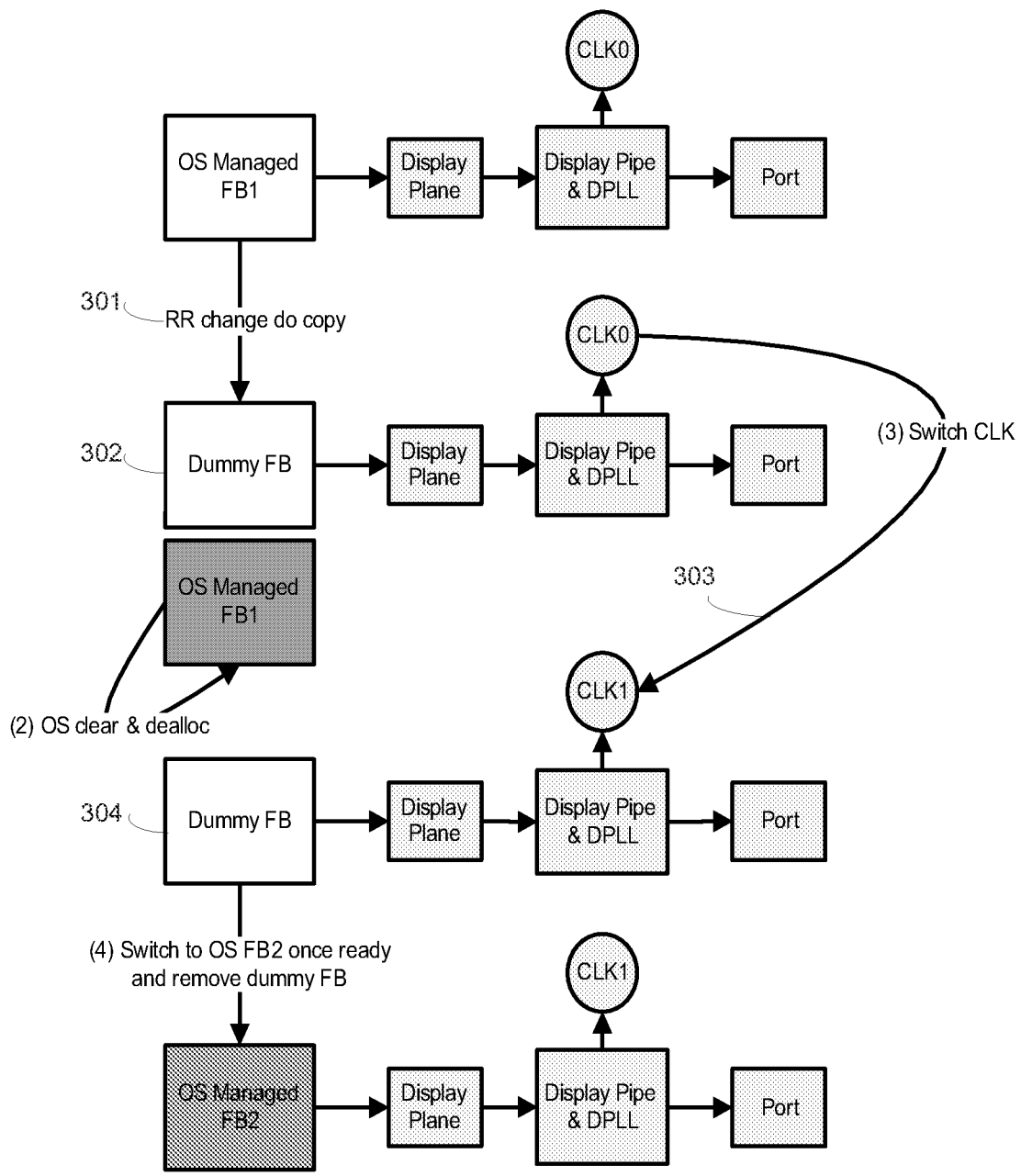
FIG. 3 depicts an example manner of changing refresh rates in a system along with units involved.

FIG. 3 depicts an example manner of changing refresh rates in a system. At 301, in response to a request from a display driver to change a refresh rate, contents of an OS managed frame buffer FB1 are copied to a dummy frame buffer. At 302, the dummy frame buffer is used to provide frames to a display plane (device). At 303, a frequency of a clock source is changed from CLK0 to CLK1. During the change in clock frequency, the dummy frame buffer is used to output frames to the display plane. At 304, the frame buffer source is changed from the dummy frame buffer to an OS managed frame buffer FB2 during the Video Blanking Interval (VBI) of the frame. No flicker is visible because change in frame buffer source takes place during a VBI.

Figure 4:
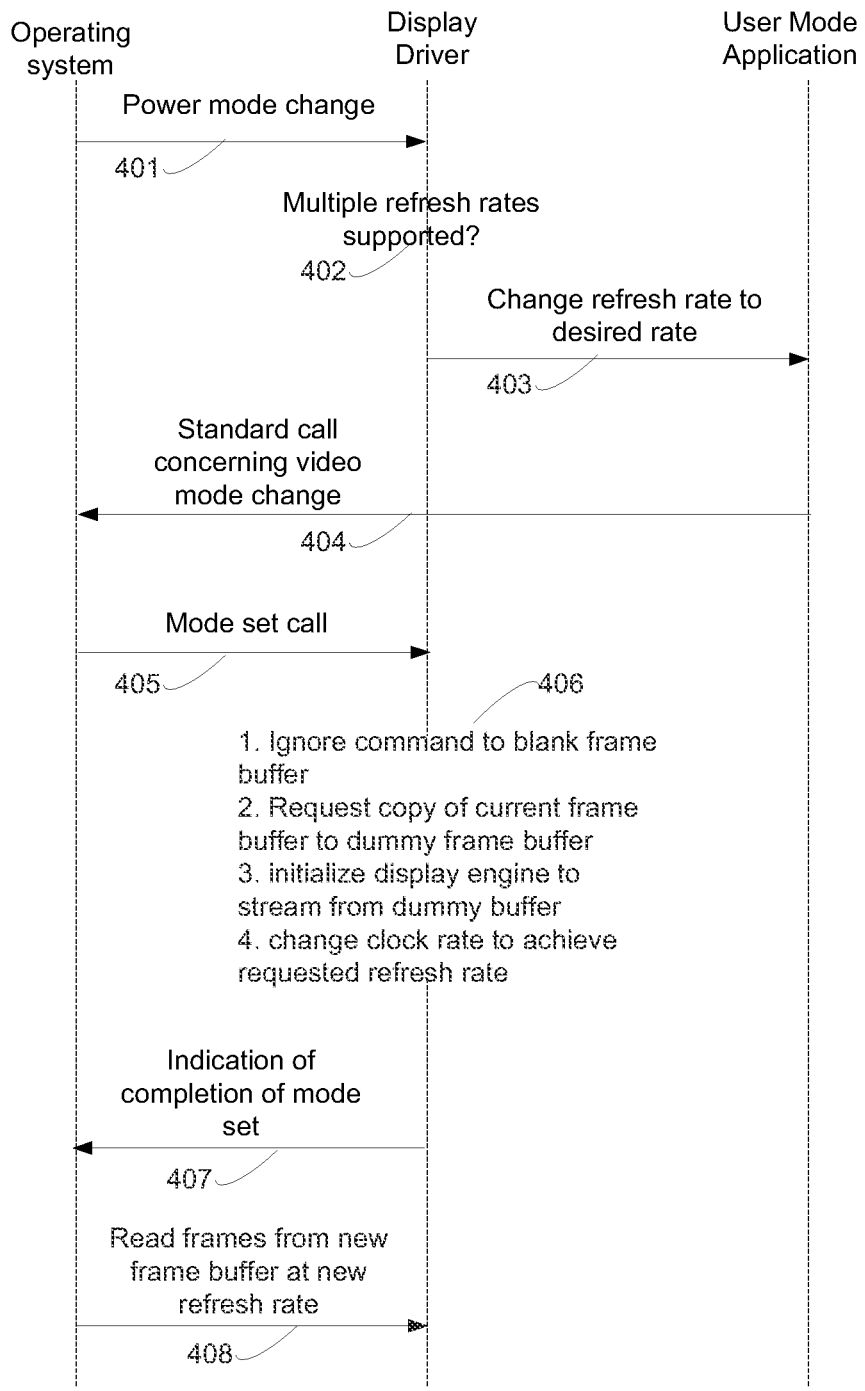
FIG. 4 depicts an example of communications between an operating system, display driver, and user mode application to change refresh rate.

FIG. 4 depicts an example of communications between an operating system, display driver, and user mode application to change refresh rate. At 401, an operating system indicates a power mode change to a display driver. The power mode change can occur in response to an indication that DC or battery power is used. At 402, the display driver determines whether multiple refresh rates are supported by the display engine. At 403, the display driver requests the user mode application to change the refresh rate to a desired rate. For example, the desired rate can be 48 or 50 Hz or another rate. At 404, the user mode application issues a standard call to the OS for a video mode change to change the refresh rate. At

405, the OS issues a mode set call to the display driver to change a refresh rate. At 406, the display driver responds to the mode set call to change a refresh rate by: (1) ignoring command to blank frame buffer, (2) requesting copy of current frame buffer to dummy frame buffer, (3) initializing display engine to stream frames from the dummy buffer beginning after the next vertical blanking interval, and (4) changing the clock rate to achieve requested refresh rate using software instructions. At 407, the display driver indicates to the OS completion of the new mode set requested by the OS. At 408, the OS requests the display driver to request the display engine to read frames from the next frame buffer at the new refresh rate.

Figure 5:
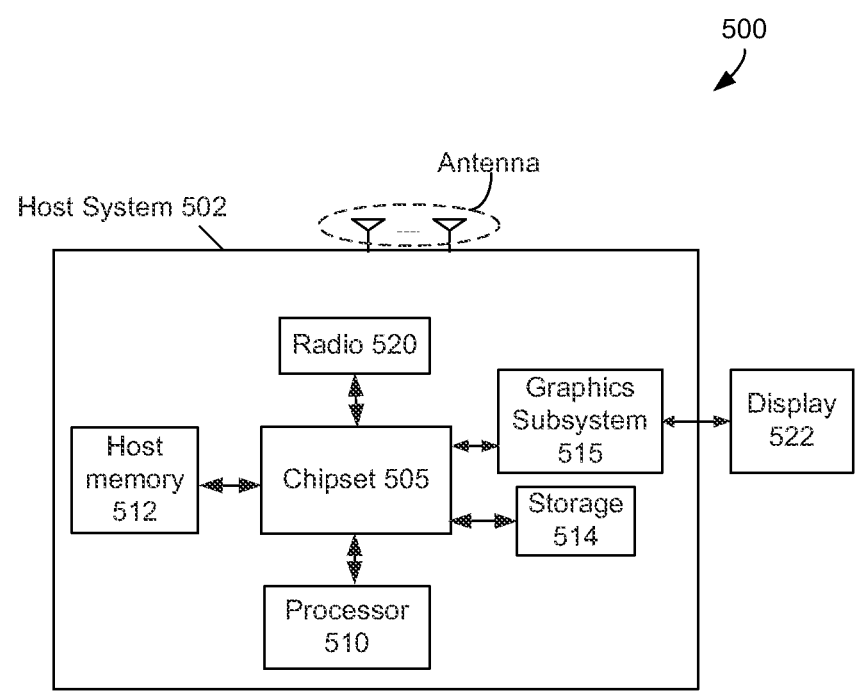
FIG. 5 depicts an example system in accordance with an embodiment.

FIG. 5 depicts an example system in accordance with an embodiment. Computer system 500 may include host system 502 and display 522. Computer system 500 can be implemented in a handheld personal computer, mobile telephone, set top box, or any computing device. Any type of user interface is available such as a keypad, mouse, touch sensitive screen, and/or motion sensitive interface. Host system 502 may include chipset 505, processor 510, host memory 512, storage 514, graphics subsystem 515, and radio 520. Chipset 505 may provide intercommunication among processor 510, host memory 512, storage 514, graphics subsystem 515, and radio 520. For example, chipset 505 may include a storage adapter (not depicted) capable of providing intercommunication with storage 514.

Processor 510 may be implemented as Complex Instruction Set Computer (CISC) or Reduced Instruction Set Computer (RISC) processors, x86 instruction set compatible processors, multi-core, or any other microprocessor or central processing unit. In various embodiments, processor 510 performs instructions that permit change of refresh rate using the OS but without incurring a visible flicker.

Host memory 512 may be implemented as a volatile memory device such as but not limited to a Random Access Memory (RAM), Dynamic Random Access Memory (DRAM), or Static RAM (SRAM). Storage 514 may be implemented as a non-volatile storage device such as but not limited to a magnetic disk drive, optical disk drive, tape drive, an internal storage device, an attached storage device, flash memory, battery backed-up SDRAM (synchronous DRAM), and/or a network accessible storage device.

Graphics subsystem 515 may perform processing of images such as still or video for display. An analog or digital interface may be used to communicatively couple graphics subsystem 515 and display 522. For example, the interface may be any of a High-Definition Multimedia Interface, DisplayPort, wireless HDMI, and/or wireless HD compliant techniques. Graphics subsystem 515 could be integrated into processor 510 or chipset 505. Graphics subsystem 515 could be a stand-alone card communicatively coupled to chipset 505.

Radio 520 may include one or more radios capable of transmitting and receiving signals in accordance with applicable wireless standards such as but not limited to any version of IEEE 802.11 and IEEE 802.16. For example, radio 520 may include at least a physical layer interface and media access controller.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Embodiments of the present invention may be implemented as any or a combination of: one or more microchips or integrated circuits interconnected using a motherboard, hard-wired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments of the present invention may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A computer-implemented display driver method comprising:
  issuing a request to change a refresh rate of a display;
  processing a request to change a mode set, the mode set specifying the requested refresh rate of the display and requesting to blank an entire next frame buffer;
  in response to the request to change the mode set:
    ignoring a command associated with the request to change the mode set to blank the entire next frame buffer,
    requesting a copy of a frame in a current frame buffer into a second buffer,
    initializing a display engine to read video from the second buffer, and
    requesting to change a clock rate to the requested refresh rate; and
  indicating completion of the new mode set to an operating system despite not performing the request to blank the entire next frame buffer in the mode set.

2. The method of claim 1, wherein the issuing a request to change a refresh rate of a display occurs in response to support of multiple refresh rates by a display driver.

3. The method of claim 1, wherein the issuing a request to change a refresh rate occurs in response to an indication of a power mode change to DC or battery power.

4. The method of claim 1, wherein the issuing a request to change a refresh rate occurs in response to an indication of display of video at 24 frames per second.

5. The method of claim 1, further comprising:
during a vertical blanking interval, changing from streaming images for display from the current frame buffer to streaming from the second buffer.

6. The method of claim 1, further comprising:
changing a clock rate to the requested refresh rate approximately during a vertical blanking interval.

7. The method of claim 1, wherein the requesting to change a clock rate to the requested refresh rate comprises issuing commands to a software controllable clock source.

8. At least one non-transitory computer-readable storage medium comprising instructions stored thereon, which when executed by a machine, cause the machine to:
issue a request to change a refresh rate of a display;
process a request to change a mode set, the mode set to specify the requested refresh rate of the display and to request to blank an entire next frame buffer;
in response to the request to change the mode set:
ignore a command associated with the request to change the mode set to blank the entire next frame buffer,
request a copy of a frame in a current frame buffer into a second buffer,
request to initialize a display engine to read video from the second buffer, and
request to change a clock rate to the requested refresh rate; and
indicate completion of the new mode set to an operating system despite non-performance of the request to blank the entire next frame buffer in the mode set.

9. The computer-readable storage medium of claim 8, wherein to issue a request to change a refresh rate of a display occurs in response to an indication of a power mode change to DC or battery power or an indication of display of video at 24 frames per second.

10. The computer-readable storage medium of claim 8, further comprising instructions stored thereon, which when executed by a machine, cause the machine to:
during a vertical blanking interval, change from reading images for display from the current frame buffer to streaming from the second buffer.

11. The computer-readable storage medium of claim 8, further comprising instructions stored thereon, which when executed by a machine, cause the machine to:
change a clock rate to the requested refresh rate approximately during a vertical blanking interval.

12. The computer-readable storage medium of claim 8, wherein the request to change a clock rate to the requested refresh rate comprises issuance of commands to a software controllable clock source.

13. A system comprising:
at least one antenna;
a display device;
a memory to store a first and second frame buffer;
at least one processor communicatively coupled to the at least one antenna, display device, and the memory and the at least one processor to execute an operating system, a display driver, and a
user mode application, wherein
the operating system is to indicate a power mode change to the display driver,
the display driver is to issue a request to the user mode application to change a refresh rate of the display device in response to support of multiple refresh rates by the display driver,
the user mode application is to issue a video mode change call to the operating system in response to receipt of the request to change a refresh rate,
the operating system is to issue a mode set call to the display driver in response to receipt of the video mode change call, the mode set to specify the requested refresh rate and to request to blank an entire next frame buffer,
the display driver is to perform actions to change the refresh rate but not perform the request to blank the entire next frame buffer and indicate completion of the mode set despite non performance of the request to blank an entire next frame buffer, and
the operating system is to request to read frames from the second frame buffer at the requested refresh rate.

14. The system of claim 13, wherein:
the operating system is to indicate a power mode change to a display driver in response to extended battery mode or use of DC power.

15. The system of claim 13, wherein:
the display driver is to issue a request to the user mode application to change a refresh rate of the display device in response to an indication of a power mode change to DC or battery power or an indication of display of video at 24 frames per second.

16. The system of claim 13, wherein:
during a vertical blanking interval, there is a change from streaming video from the first frame buffer to streaming from the second buffer.

17. The system of claim 13, wherein to perform actions, the display driver is to:
ignore a command to blank a next frame buffer;
request a copy of a frame in a current frame buffer into the second buffer;
request to initialize a display engine to read video from the second buffer, and
request to change a clock rate to the requested refresh rate.

18. The system of claim 17, wherein the change of the clock rate to the requested refresh rate takes place approximately during a vertical blanking interval.

19. The system of claim 17, wherein the request to change a clock rate to the requested refresh rate comprises issuance of commands to a software controllable clock source.

* * * * *